United States Patent [19]

Severinsson et al.

[11] Patent Number: 4,850,694
[45] Date of Patent: Jul. 25, 1989

[54] ALIGNMENT MEANS FOR A LIGHT SOURCE EMITTING INVISIBLE LASER LIGHT

[75] Inventors: Stefan A. Severinsson, Lindome; Karl J. O. Hasselskog, Västra Frölunda, both of Sweden

[73] Assignee: Telefonaktiebolaget L M Ericsson, Stockholm, Sweden

[21] Appl. No.: 152,241

[22] Filed: Feb. 4, 1988

[30] Foreign Application Priority Data

Feb. 6, 1987 [SE] Sweden .................. 8700469

[51] Int. Cl.[4] .................................. G01B 11/00
[52] U.S. Cl. .................................. 356/153
[58] Field of Search .................. 356/153; 350/538

[56] References Cited

U.S. PATENT DOCUMENTS 3,712,702  1/1973  Schmidt .................. 350/538
4,653,879  3/1987  Filipovich .................. 350/538

FOREIGN PATENT DOCUMENTS 2536878  2/1977  Fed. Rep. of Germany .
1483793  8/1977  United Kingdom .
2088082  11/1980  United Kingdom .
2119125  11/1983  United Kingdom .

Primary Examiner—F. L. Evans
Attorney, Agent, or Firm—Burns, Doane, Swecker & Mathis

[57] ABSTRACT

An alignment means for a light source (10) emitting invisible laser light intended, for example, as a guide beam in a laser alignment agent. The means includes a monocular (5,6) a reflecting prism (4) for deflecting part of the emitted laser light and reflecting it to the objective (5) of the monocular, and an image converter (19) for generating a visible image of the reflected laser light. The problem with a heavily deteriorated monocular image due to the image converter is avoided by the converter (19) being spaced from the optical axis (7) of the monocular and by the reflected laser light solely being taken through the image converter (19), subsequent to which the now visible laser image is superimposed on the ordinary monocular image.

10 Claims, 4 Drawing Sheets

ALIGNMENT MEANS FOR A LIGHT SOURCE EMITTING INVISIBLE LASER LIGHT

TECHNICAL FIELD

The invention relates to an alignment means for a light source emitting invisible laser light. The means includes a monocular, a reflecting prism arranged to deflect a part of the emitted laser light and reflect it to the objective of the monocular, and an image converter for generating a visible image of the reflected laser light. The alignment means can be used, for example, in association with a laser alignment agent where the laser beams function as so-called guide beams.

BACKGROUND ART

In known apparatus of this kind the image converter is situated inside the monocular, e.g. at the focal point of the light rays in the vicinity of the monocular eyepiece. However, this has the undesirable result that the ordinary monocular image suffers a degradation in resolution and acquires a greenish cast due to the restricted performance of the image converter with respect to resolution and spectral range. Small details at large distances will therefore merge together in the monocular image.

Known apparatus of this kind is described in DE No. 2536878. 7

SUMMARY OF THE INVENTION

The object of the present invention is to provide an alignment means of the kind mentioned above, but in of the problem with a greatly deteriorated monocular image is avoided. This is achieved by positioning the image converter spaced from the optical axis of the monocular so that only the reflected laser light passed through the image converter, after which the now-visible laser image is superimposed on the ordinary monocular image.

This object is met in the present invention through provision of a monocular having an optical axis, and means for deflecting at least part of the invisible laser light into a beam substantially coincident with the axis. The beam is then diverted off of the optical axis and directed through an optical converter. The now-visible beam is then deflected back onto the axis, so that it is superposed on an image perceivable through an eyepiece on the monocular.

BRIEF DESCRIPTION OF DRAWINGS

The invention will now be described in more detail below with reference to the drawings, on which.

DETAILED DESCRIPTION OF PREFERRED EMBODIMENTS

Figure 1:
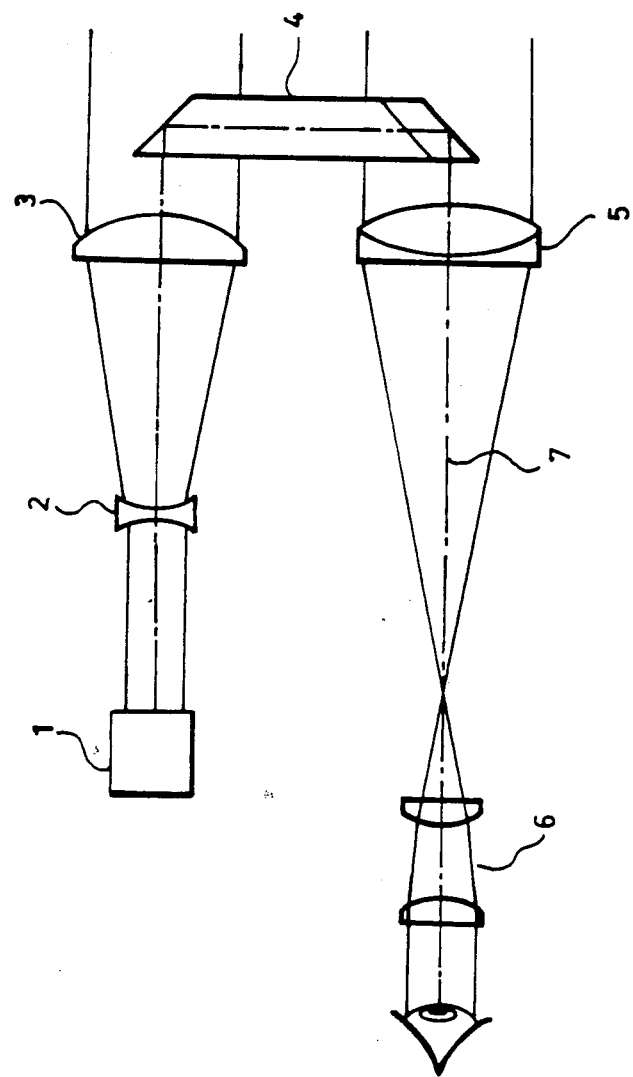
FIG. 1 illustrates a known alignment means.

A known alignment means is illustrated in FIG. 1. A light source 1 generates visible laser light. Transmission optics including a divergent lens 2 and a convergent lens 3 provide a parallel ray bundle, which partially impinges on a prism 4. The prism is of the type which reflects incident rays in a manner such that the reflected rays, at least practically, will be parallel to the incident rays irrespective of their angle of incidence to the prism. A so-called cube corner prism is an example of a prism having such properties. A monocular with its optical axis 7 is provided with an eyepiece 6 and an objective 5 and is arranged parallel to the laser rays. A part of the emitted laser beam is deflected with the aid of the prism into the monocular image field and is perceived in the monocular as an illuminated dot. The position of the dot in the monocular image shows the direction of the laser with an accuracy solely determined by the precision of the prism. The laser and the monocular thus do not need to be completely parallel.

In the use of a laser emitting invisible light it is known to place an image converter at the eyepiece of the monocular. In such a case the image converter is placed with its input surface in the focal plane of the monocular and achieves a visible spot of the reflected laser light in the monocular. As mentioned above, the ordinary monocular image is deteriorated due to the image converter, in as far as the image is given poor resolution and becomes greenish, which can result in an inability to distinguish small details.

Figure 2:
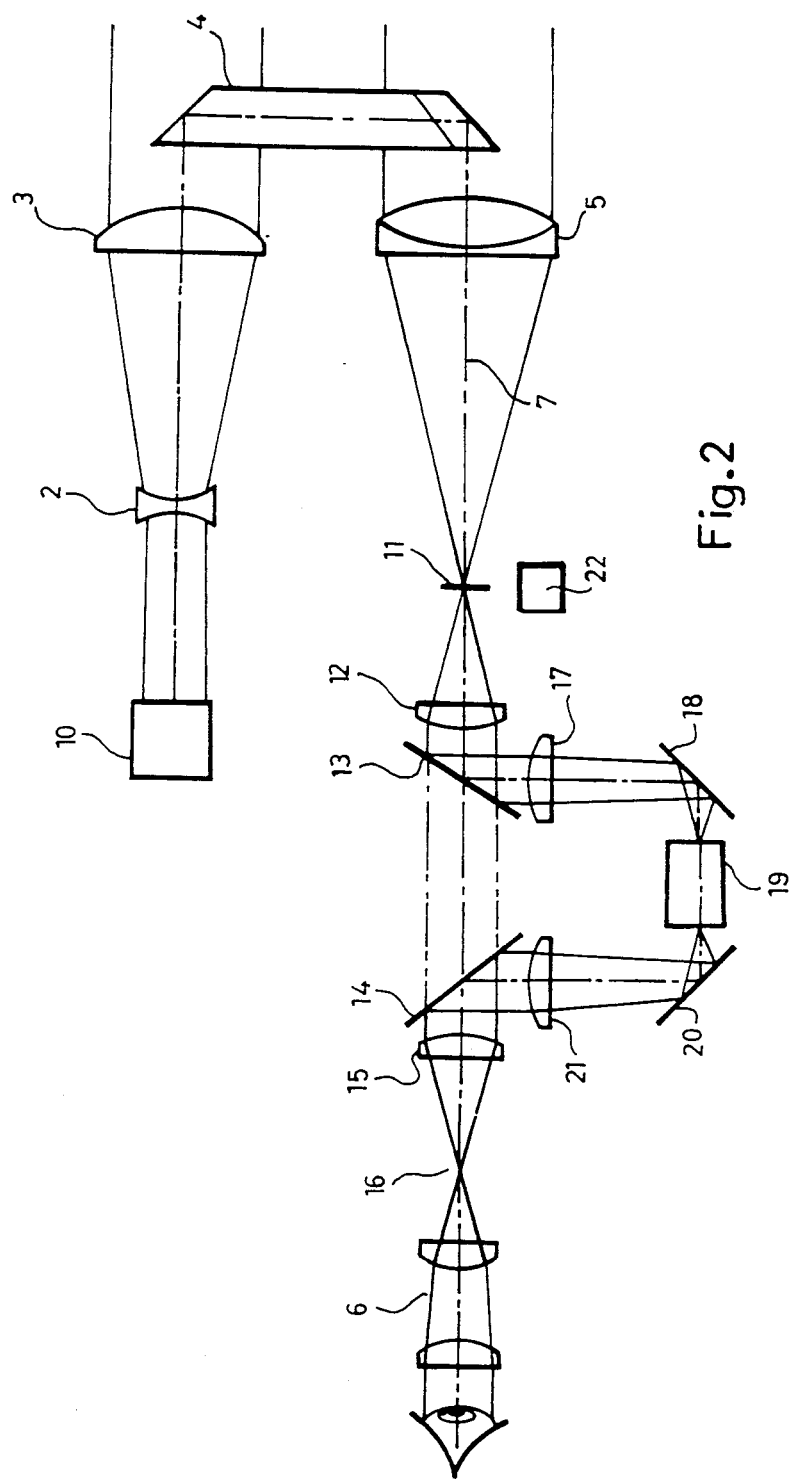
FIG. 2 illustrates a first embodiment of an alignment means in accordance with the invention.

A first embodiment of an alignment means in accordance with the invention is illustrated in FIG. 2. A light source 10 generates invisible laser light. The units 2-7 correspond to the units with the same numerical designations in FIG. 1. The light rays in the monocular are collimated by a converging lens 12 after having passed a first focal plane 11. Visible light then passes a first 13 and a second 14 beam splitter, and is focused by a converging lens 15 towards a second focal plane 16.

The beam splitter 13 is adapted to deflect the reflected and the invisible laser light. The deflected rays are focused on the input surface of an image converter 19 with the aid of a converging lens 17 and a reflecting member 18. The image converter is thus situated spaced from the optical axis 7 of the monocular and therefore only laser light passes through it. The light rays from the output surface of the image converter, these rays representing the now-visible and greenish image of the laser spot, are reflected by a reflecting member 20, collimated by a converging lens 21 and are then incident on the beam splitter 14. The reflecting members 18 and 20 may be optical elements such as prisms or mirrors. The beam splitter 14 is adapted to pass the visible light through from the beam splitter 13 and deflect the light from the image converter 19. Both beam splitters 13 and 14, which are also known as dichroic filters, may be so-called beam splitter cubes, and are thus not identical since the beam splitter 14 is adapted to pass visible light through, which is incident on one side of it, and deflect the greenish light from the image converter incident on its other side. On the other hand, the beam splitter 13 is adapted to let through all visible light and only to deflect the invisible laser light.

The light from the image converter 19 deflected in the image splitter 14 is focused together with the light rays from the beam splitter 13 towards a second focal plane 16 in the monocular and is thus superimposed on the ordinary monocular image.

Since only the light rays coming from the laser light pass the image converter, deterioration of the ordinary monocular image is avoided although an image converter is utilized to generate a visible spot of invisible laser light. The image of the laser spot coming from the image converter will be somewhat larger than the image of the laser spot from the visible laser light in the means according to FIG. 1. This is of subordinate importance however, since the central point of the spot can easily be distinguished even so.

As a result of incidents causing mechanical stress such as blows or shocks during transport, the image converter 19 or any of the units 13, 14, 17-21 may be knocked out of alignment, resulting in incorrect information as to the actual direction of the laser light source 10. In order that the means can be calibrated, a glass plate with clear marking, e.g. cross-hairs, is placed at the focal plane 11 of the monocular objective. By illuminating the cross-hairs with light of approximately the same wavelength as that of the laser 10, and also with visible light, two images of the cross-hairs are obtained at the second focal plane 16 in the monocular. One image is obtained at the second focal plane 16 in the monocular. One image is obtained directly in the monocular via the lenses and beam splitters 12-15, while the other image is obtained with the aid of the image converter 19. The means is adjusted by one of the units 13, 14, 17-21 being adjusted so that both images coincide. Since continous illumination is required in the calibration, a light source 22 giving continous light is used in this case, and not the laser 10 which only provides short light pulses. The light source 22 can conventionally be a light emitting diode, situated to one side of the focal plane 11.

Figure 3:
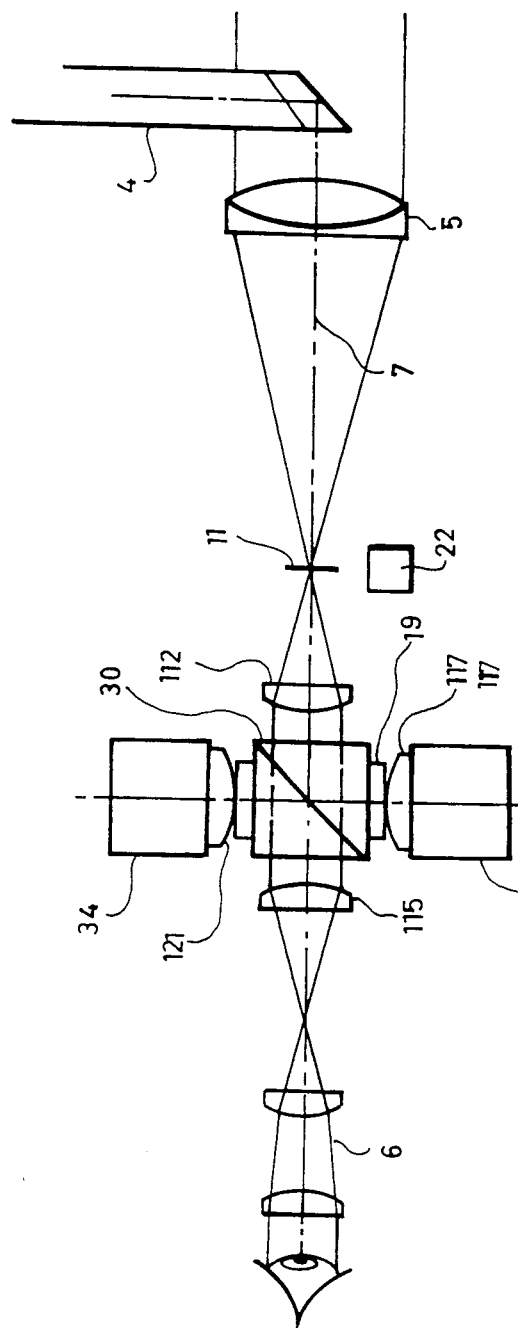
FIG. 3 illustrates a part of a second embodiment of an alignment means in accordance with the invention.
Figure 4:
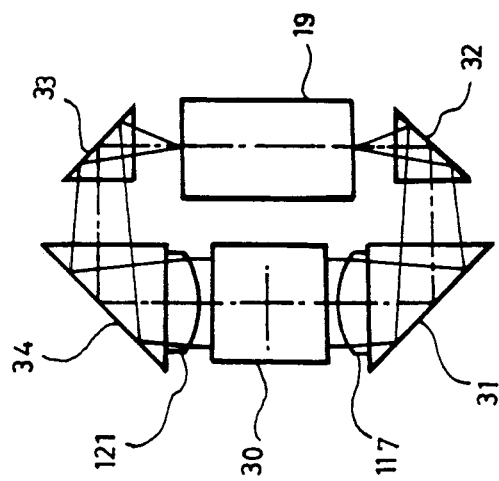
FIG. 4 illustrates a part of the means according to FIG. 3 seen from one side.

Part of a second embodiment of an alignment means in accordance with the invention is illustrated in FIGS. 3 and 4, FIG. 3 being a plan of the means and FIG. 4 a side-view from the right of a part of the means according to FIG. 3. The laser light source and transmission optics are not depicted in FIGS. 3 and 4. The members having a direct counterpart in previous Figures have been provided with the same reference numerals as in these Figures. Members which have a substantially similar task as the members in FIG. 2 have been provided with reference numerals exceeding the value of the corresponding numerals in FIG. 2 by 100.

Only a single beam splitter is utilized in this means. The beam splitter comprises a beam splitter cube 30 having a beam splitting surface denoted by a diagonal line across the cube in FIG. 3, and extending at right angles to the plane of the paper. The light rays in the monocular are collimated by a convergent lens 112 and are incident on the beam splitter 30. The latter is adapted to let through visible light incident from the right in FIG. 3, i.e. incident to the plane of the paper in FIG. 4. The light is then incident on a convergent lens 115, which focuses it towards the eyepiece 6.

The invisible light is deflected in the beam splitter 30 towards a convergent lens 117 and further towards a prism 31, which in turn reflects the light towards a prism 32. In FIG. 3 the prism 32 is under the prism 31 and is therefore not visible in this Figure. The light is reflected in the prism 32 and is focused on the input surface of the image converter 19, which is hidden to a large extent in FIG. 3.

In this case as well, the image converter is also situated spaced from the monocular axis 7, and is thus only light rays from the laser source pass through it. The visible light from the output of the image converter is reflected by two prisms 33 and 34 towards a collimating lens 121 and are then incident on the beam splitter 30. The latter is also adapted to deflect the greenish light coming from the lens 121, this light coming from the image converter 19, to the left in FIG. 1, i.e. in the plane of the paper in FIG. 4. The light is then incident on the lens 115 and is superimposed on the ordinary monocular image.

Reflecting members other than prisms can of course be used instead of the prisms 31-34. The means in accordance with this embodiment can also be adjusted with the aid of cross-hairs in the focal plane 11 in the same way as the means according to FIG. 2.

Both illustrated embodiments can naturally be changed within the scope of the claims. For example, the image converter can be used together with a monocular with more than two focal planes. It is also conceivable to place the beam splitters in ray bundles which are not parallel.

We claim:

1. Apparatus for aiming a beam of invisible laser light, comprising:
   a monocular having an optical axis;
   means, arranged to receive at least part of said beam of invisible laser light, for deflecting said at least part of said beam onto said optical axis, to form an aligned beam;
   means, arranged to receive said aligned beam, for diverting said aligned beam off said optical axis to form a diverted beam;
   means, arranged spaced from said optical axis to receive said diverted beam, for converting said invisible laser light into visible light; and
   means, arranged to receive said visible light, for deflecting said visible light to be substantially coincident with said first optical axis,
   whereby said visible light is superposed on an image perceivable through an eyepiece on said monocular.

2. An apparatus as claimed in claim 1, wherein said deflecting means comprises a reflecting prism.

3. An apparatus as claimed in claim 1, wherein said converting means comprises an image converter.

4. An apparatus as claimed in claim 1, wherein said deflecting means is arranged and adapted so that said aligned beam is substantially parallel to said beam of invisible laser light.

5. An apparatus as claimed in claim 1, wherein said diverting means comprises:
   a first beam splitter arranged to deflect said aligned beam;
   a first reflecting member, arranged to receive the deflected light from said first beam splitter, for reflecting the deflected light to said converting means;
   a second reflecting member, arranged to deflect said visible light from said converting means; and
   a second beam splitter, arranged to receive light from the second reflecting means, for aligning the deflected visible light to be substantially coincident with said first optical axis.

6. An apparatus as claimed in claim 1, wherein said diverting means comprises:
   a beam splitting cube arranged to deflect said aligned beam;
   a first reflecting member, arranged to reflect light deflected by said beam splitting cube;
   a second reflecting member, arranged to receive light reflected by said first reflecting member, for direction the received light toward said converting means;
   a third reflecting member arranged to reflect said visible light from said converting means; and fourth reflecting means, arranged to receive light reflected by said third reflecting means, for reflecting the reflected light toward said beam splitting cube, said beam splitting cube being arranged and adapted to align light reflected by said fourth reflecting means to be substantially coincident with said optical axis, and said first, second, third, and fourth reflecting members lying substantially in a common plane substantially perpendicular to said optical axis.

7. An apparatus as claimed in claim 1, wherein said monocular comprises:
an objective; and
means between said objective and said diverting means for superposing a positional marker on said image.

8. An apparatus as claimed in claim 7, further comprising means for illuminating said positional marker with light of approximately the same wavelength as said invisible laser light, and with visible light.

9. A method of aiming a beam of invisible laser light comprising the steps of:
(a) deflecting at least part of said beam onto an optical axis of a monocular to form an aligned beam;
(b) diverting said aligned beam from said optical axis to form a diverted beam;
(c) converting said diverted beam of invisible laser light into a beam of visible light;
(d) deflecting said beam of visible light back onto said optical axis to superpose said beam of visible light on an image perceivable through an eyepiece on said monocular.

10. A method as claimed in claim 9, wherein said step (a) further comprises deflecting said at least part of said beam so that said aligned beam is substantially parallel to said beam.

* * * * *